3,050,985
APPARATUS FOR GAUGING THE CURVATURE OF SHEET MATERIAL

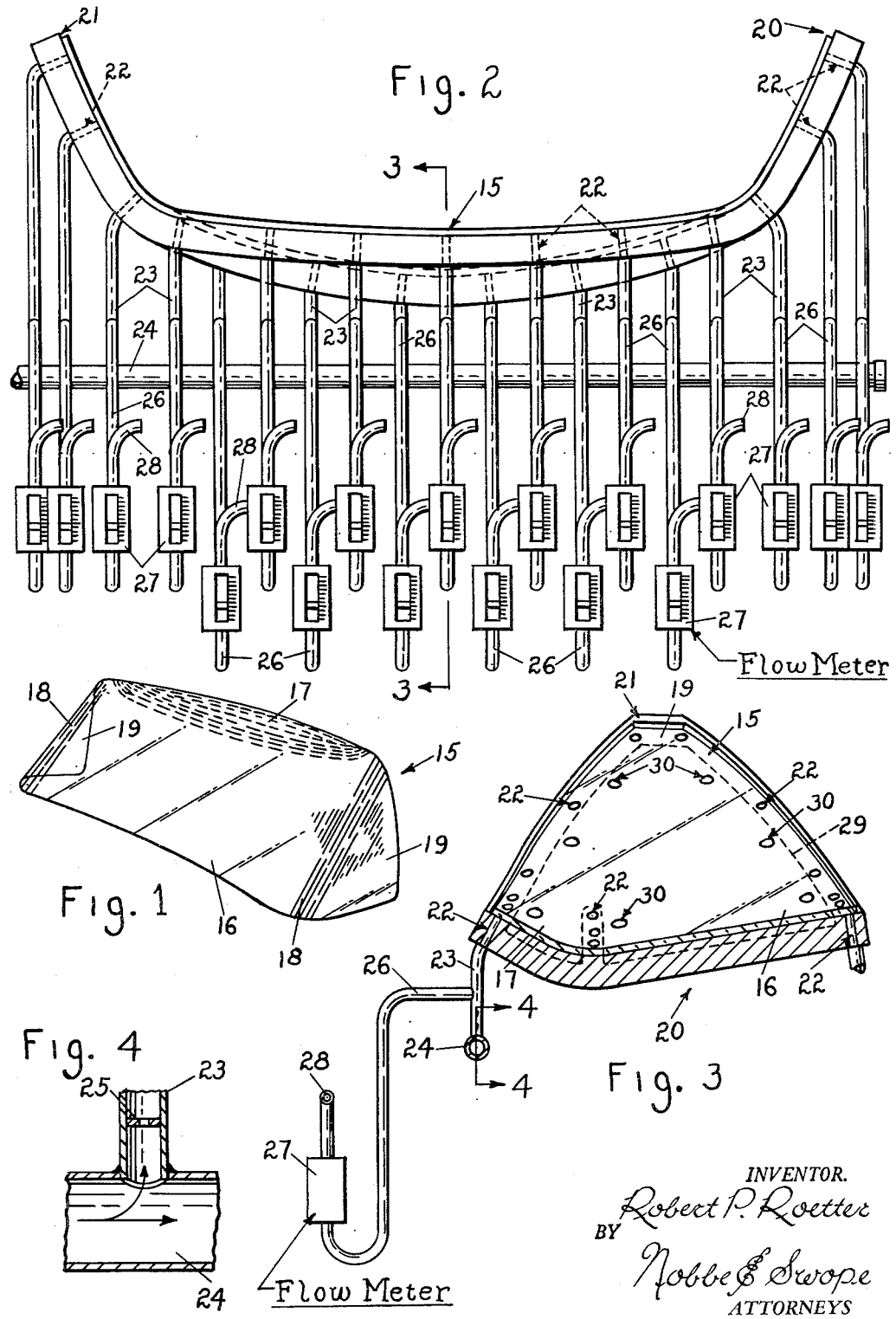

Robert P. Roetter, Perrysburg, Ohio, assignor to Libbey-Owens-Ford Glass Company, Toledo, Ohio, a corporation of Ohio
Filed Sept. 14, 1959, Ser. No. 839,867
8 Claims. (Cl. 73—37.8)

This invention is concerned with gauging the curvature of sheet material. More particularly, it relates to a novel apparatus for determining whether curved articles made from sheet materials, such as glass sheets, are dimensionally within prescribed tolerances.

The evolution of complexly curved glass sheets, particularly in the automotive industry, has introduced the manufacturer of such articles to many new problems, one of the most elusive being a reliable and economical method for dimensionally inspecting these articles as they are produced.

Prior to the subject invention, male forms were cast of plaster conforming to the contour of the glass to be inspected. The curved or bent sheet of glass was placed upon the form and feeler gauges inserted at intervals between the marginal portions of the article and the form to determine whether the amount of clearance there-between was within allowable tolerances.

This is a slow and tedious procedure, subject to errors in judgement and the method does not lend itself well to measuring the depth of the bend inside the margins of the article, particularly in so-called panoramic and "cap" windshields. Though the apparatus of the subject invention is primarily intended to gauge the curvature of glass sheets at their margins it may also be advantageously used to gauge the clearance between the article and the master form at other points removed from the margin.

It is therefore an object of this invention to provide a novel apparatus for gauging the deviation of the curves of bent sheets of glass from a prescribed curvature.

Another object of the invention is to provide novel apparatus for indicating the magnitude of said deviation at one or more reference points.

Still another object of the invention is to indicate the amount of deviation at each reference point on a direct reading indicator.

These and other advantages of the invention will become more apparent during the course of the following description, when taken in conjunction with the accompanying drawings.

In the drawings, wherein like numerals are employed to designate like parts through the same:

FIG. 1 is a perspective view of an article manufactured from sheet glass;

FIG. 2 is a side elevation of the apparatus provided by the invention for gauging the curvature of the article illustrated in FIG. 1;

FIG. 3 is a cross section taken on the line 3—3 of FIG. 2; and

FIG. 4 is a fragmentary section taken on the line 4—4 of FIG. 3.

The article of manufacture shown in FIG. 1 and generally indicated by the numeral 15, consists of an automotive windshield of the so-called "cap" type. This windshield comprises a central area 16 curved about its longitudinal axis over its entire height and curved upwardly and toward the interior of the vehicle in a "cap" portion at its uppermost margin as indicated by the numeral 17. The central area blends at each end in a relatively short radius bend 18 to the terminal portions 19 of the windshield 15, which in some instances extend toward the rear of the automobile at substantially right angles to the central area 16.

Though the apparatus disclosed herein is primarily intended for gauging the curvature of a bent sheet of glass at the peripheral margin to assure the mounting of the glass without imposing any tension or strain thereupon, it will become apparent that the invention may also be employed for gauging the curvature of the glass in areas other than the margins. It will also become apparent that the location of the gauging or reference points and the number of such points will vary with the size and shape of the article being inspected.

For purposes of illustration and not as a limitation, the reference or inspection points include not only those spaced around the marginal periphery of a windshield to determine whether the windshield will fit into its mounting, but also include one or more check points at the beginning of the "cap" portion to indicate the depth of the bend. The depth of the bend is important primarily for uniformity in appearance, however, the apparatus disclosed herein may also be used to check the two sheets of glass to be used in a laminated windshield to determine whether they will nest perfectly one into the other. Since production of the bent sheets is on a continuous basis and at a rapid rate, it is desirable to detect imperfect articles as they are produced so that corrective measures may be taken immediately and before the accumulation of any substantial quantity of imperfect or scrap articles.

Referring now to the drawings there is provided a base 20 which may be made of plaster or other suitable material, with the upper surface 21 thereof being concave and conforming to the outer or convex surface of the windshield 15. Extending through the thickness of the base 20 around the periphery thereof and terminating flush with the upper surface 21 are a plurality of nozzles or tubes 22, the axis of each nozzle being substantially normal to the outer surface of the windshield when placed upon the base at the selected reference or check points. Each of the nozzles 22 is connected by a pipe 23 to a manifold or header 24 adapted to deliver a constant volume of air from a suitable source at a closely regulated pressure.

As shown in FIG. 4, an orifice plate 25 is mounted in each pipe 23 adjacent its juncture with the air supply manifold 24 thereby metering the volume of air at each orifice plate. The orifices in the plates 25 are uniform in diameter. A branch pipe 26 communicates with each pipe 23 at a point between the respective nozzle 22 and orifice plate 25 and is connected to the inlet side of an air flow meter 27. An outlet pipe 28 discharges air from the flow meter 27 to the atmosphere. For production purposes the flow meter 27 may be graduated to indicate dimensional deviation or clearance between each nozzle outlet and the windshield in fractional or decimal increments of an inch or may be separated into two zones respectively indicating that the deviation from the prescribed curvature at that particular reference point is either within or outside acceptable tolerances.

In carrying out the invention, a curved or bent glass article, such as a windshield 15, is positioned on the base 20 and compressed air admitted through the manifold 24 to each of the nozzles 22 through the corresponding orifice plate 25 in pipe 23. Assuming that the windshield 15 perfectly seals the outlet end of each nozzle 22, the air will take the line of least resistance through the individual branch pipes 26 and flow meters 27 to be discharged through the outlet pipes 28 to the atmosphere. The indicating portion of each of the flow meters will be moved by the flow of air a maximum amount which will indicate that the periphery of the windshield is bent to the desired curvature at all reference points. For convenience, the flow meters 27 may be calibrated to indicate deviation from the prescribed curvature in increments of an inch and whenever any of the nozzles 22 are sealed by the windshield 15 all of the air will be bypassed through the associated meter and the reading would indicate zero clearance at that point.

However, assuming that all of the nozzles 22 are not completely sealed by the windshield 15 the volume of air escaping through such nozzles would be proportionate to the amount of clearance between the form 20 and the windshield 15 at such points. Thus, with the flow meter 27 calibrated in hundredths of an inch, clearance of 1/16 of an inch between the nozzle and the windshield 15 would be indicated as .06 on the meter. In this instance, though the meter 27 is actually measuring the volume of air flowing through it, the scale is inverted to indicate the volume of air escaping from the associated nozzle 22. In this way, the amount of clearance between the base 20 and the windshield at each reference point or nozzle can be accurately determined.

A more practical arrangement for production inspection is to divide the scale of each flow meter into two zones, one zone indicating that the curvature of the windshield 15 is within an acceptable tolerance and the other zone indicating that the curvature of the windshield is outside this tolerance. This system permits an insepctor to rapidly scan the bank of meters 27 to determine whether the windshield is acceptable or should be rejected.

In some instances it has been found desirable to cut away the upper surface of the form 20 to provide clearance between the form and glass in the non-critical areas, such as defined by the broken lines 29 in FIG. 3, so that the article to be inspected will be supported only around its periphery. Though the advantage of providing clearance in the non-critical areas strongly recommends an outline or skeleton-type apparatus, the method disclosed herein permits filling in of any clearance area and inserting a nozzle so that reference points may be shifted or new points added with little additional work.

Thus, in certain instances the windshield 15 may snugly fit the marginal edge of the form 20 whereas portions of the windshield inwardly of the marginal edge may be spaced from the form. In such case, in order to obtain the proper gauging of the curvature of the windshield inwardly of the edge, should a tight fit be made between the edge of the windshield and form 20, it is necessary to provide a proper escape for the air and this is effected by the provision of one or more openings 30 which extend through the form at points inwardly of the peripheral margin of the form to permit the exhaust of the air.

While in the specific form of the invention illustrated, the windshield is suported upon a checking form or fixture through which the nozzles 22 extend, it will be appreciated that in certain instances the form may be omitted and the windshield supported directly upon the outlet ends of the nozzles which are arranged to form the desired outline and curvature. With such an arrangement the apparatus would function in the same way to indicate the amount of clearance between each nozzle and the windshield and thus show whether or not the curvature of the peripheral margin of the windshield is within the required acceptable tolerance at any one of the reference points or nozzles.

It is to be understood that the form of the invention herewith shown and described is to be taken as an illustrative embodiment only of the same, and that various changes in the shape, size and arrangement of parts, as well as various procedural changes may be resorted to without departing from the spirit of the invention or the scope of the subjoined claims.

I claim:

1. Apparatus for gauging sheet material for deviation from a prescribed curvature, comprising a base having a concave upper surface and having its marginal edge portion conforming in outline and curvature to the prescribed curvature of the sheet material and adapted to support the sheet material thereon, a plurality of nozzles, each provided with a discharge orifice extending through said base and disposed normal to the surface of the sheet material when positioned on said base, means for introducing a uniform volume of gas into each of said nozzles and causing it to discharge from the orifice in proportion to the amount of deviation between the base and sheet material, and means for measuring the gas discharged at each of said orifices to determine the magnitude of deviation at such point.

2. The apparatus defined in claim 1, wherein said last-named means includes a by-pass for discharging gas to the atmosphere in advance of each of said nozzles, and a volumetric flow meter in each by-pass for measuring the gas passing therethrough.

3. The apparatus defined in claim 1, wherein the upper concave surface of the base is cut away inwardly of the marginal edge portions thereof.

4. Apparatus for gauging sheet material for deviation from a prescribed curvature having, in combination, a base, a plurality of sheet supporting surfaces formed on said base, said surfaces being spaced apart on said base and conforming in curvature to the prescribed curvature of the sheet material and adapted to support the sheet thereon, a plurality of nozzles, each having an orifice extending through one of said surfaces and disposed substantially normal to the surface of the sheet when the latter is supported on the surfaces, means for introducing a uniform flow of gas into each of said nozzles with said sheet acting to restrict the discharge of gas from each of said orifices in proportion to the amount of said deviation, and means for measuring the gas discharged from each of said orifices.

5. The apparatus defined in claim 4, wherein said supporting surfaces are upstanding from said base.

6. The apparatus defined in claim 4, wherein said last-named means includes a by-pass for discharging gas to the atmosphere in advance of each of said nozzles, and a volumetric flow meter in each by-pass for measuring the gas flowing therethrough.

7. The apparatus defined in claim 6, wherein the means for introducing the gas includes an orifice plate in advance of each of said by-pass means.

8. The apparatus defined in claim 6, wherein each of said flow meters is calibrated to indicate the magnitude of said deviation at a corresponding check point.

References Cited in the file of this patent

UNITED STATES PATENTS

| 2,775,117 | Aller | Dec. 25, 1956 |
| 2,854,756 | Aller | Oct. 7, 1958 |